(12) United States Patent
Watanabe (10) Patent No.: US 7,505,075 B2
(45) Date of Patent: Mar. 17, 2009

(54) AUTOFOCUS CAMERA CAPABLE OF CALCULATING A FOCUS MATCH STATE

(75) Inventor: Toshimi Watanabe, Yokohama (JP)

(73) Assignee: Nikon Corporation, Tokyo (JP)

( * ) Notice: Subject to any disclaimer, the term of this patent is extended or adjusted under 35 U.S.C. 154(b) by 661 days.

(21) Appl. No.: 10/777,090

(22) Filed: Feb. 13, 2004

(65) Prior Publication Data

US 2004/0227843 A1 Nov. 18, 2004

(51) Int. Cl.
*G03B 13/00* (2006.01)
*H04N 5/232* (2006.01)

(52) U.S. Cl. .................. 348/354; 348/349; 348/355
(58) Field of Classification Search ......... 348/354–356, 348/335, 345
See application file for complete search history.

(56) References Cited

U.S. PATENT DOCUMENTS

| | | | | |
|---|---|---|---|---|
| 4,853,788 | A * | 8/1989 | Murashima et al. ......... | 348/355 |
| 4,967,280 | A | 10/1990 | Takuma et al. | |
| 5,539,462 | A * | 7/1996 | Lee et al. .................... | 348/349 |
| 5,614,951 | A * | 3/1997 | Lee et al. .................... | 348/356 |
| 6,512,549 | B1 * | 1/2003 | Iijima et al. ................. | 348/349 |
| 6,654,061 | B2 * | 11/2003 | Yamada ...................... | 348/355 |
| 6,700,618 | B1 * | 3/2004 | Chubachi .................... | 348/354 |
| 6,798,455 | B1 * | 9/2004 | Abe ............................ | 348/353 |
| 6,992,719 | B2 * | 1/2006 | Bompard .................... | 348/345 |

FOREIGN PATENT DOCUMENTS

JP B2 7-112254 11/1995

* cited by examiner

*Primary Examiner*—David L Ometz
*Assistant Examiner*—Pritham Prabhakher
(74) *Attorney, Agent, or Firm*—Oliff & Berridge, PLC (57) ABSTRACT

A CPU calculates integrating values of image-capturing signals in band 1 obtained by removing a frequency component equal to or lower than a first cutoff frequency from an image-capturing signal output from an image-capturing element through a band pass filter and integrating values of an image-capturing signal in band 2 obtained by removing a frequency component equal to or lower than a second cutoff frequency through a band pass filter, each in correspondence to one of a plurality of lens positions. The CPU then calculates focal point evaluation values by using these integrating values in correspondence to the individual bands. In addition, when the largest evaluation value in band 1 is judged to correspond to the closeup end position of the lens, the CPU makes a decision as to whether or not a focus match is achieved at the closeup end. The CPU uses an adjacent difference in band 1 at the closeup end, an adjacent difference ratio and an adjacent difference in band 1 at points next to the closeup end in the decision-making.

18 Claims, 5 Drawing Sheets

AUTOFOCUS CAMERA CAPABLE OF CALCULATING A FOCUS MATCH STATE

INCORPORATION BY REFERENCE

The disclosure of the following priority application is herein incorporated by reference:

Japanese Patent Application No. 2003-038424 filed Feb. 17, 2003

BACKGROUND OF THE INVENTION

1. Field of the Invention

The present invention relates to an autofocus camera.

2. Description of the Related Art

There are cameras known in the related art that include two high pass filters with different low range cutoff frequencies, to which image-capturing signals output from an image-capturing element are individually input, and execute a focal point detection based upon signals output from the two high pass filters. For instance, the camera described in Japanese Patent Examined Publication No. H 7-112254 calculates integrating values of the signals output from the individual high pass filters and judges that the camera is in a focus match state if a ratio of the integrating values (relative ratio) is equal to or greater than a predetermined value.

Since the camera described above assumes that the maximal value among focal point evaluation values is present within the range over which the focus lens is allowed to move, i.e., between the closeup end and the ∞ (infinitely distant) end, it is difficult to judge accurately that the focus match state is achieved with regard to a subject present at or in the vicinity of the closeup end.

SUMMARY OF THE INVENTION

The present invention provides an autofocus camera capable of accurately judging whether or not the focus match state is achieved with regard to a main subject.

A camera comprises: an image-capturing element that captures a subject image through a photographic lens; a first filter device that removes a frequency component equal to or lower than a first frequency from image-capturing signals obtained at pixels corresponding to a focus area of the image-capturing element; a second filter device that removes from the image-capturing signals a frequency component equal to or lower than a second frequency which is higher than the first frequency; a lens drive signal generation device that generates a lens drive signal used to move a focus lens; an evaluation value calculation device that calculates integrating values of first image-capturing signals from which the frequency component has been removed at the first filter device and integrating values of second image-capturing signals from which the frequency component has been removed at the second filter device, each in correspondence to a predefined position of the focus lens; a lens position calculation device that calculates a focus match lens position based upon one of a set of the integrating values of the first image-capturing signals and a set of the integrating values of the second image-capturing signals calculated by the evaluation value calculation device; and a determination device that makes a true/false decision with regard to a focus match position, calculated by the lens position calculation device, based upon a change manifested by the integrating values of the first image-capturing signals and a change manifested by the integrating values of the second image-capturing signals between predefined positions taken by the focus lens.

It is preferable that the determination device determines that the focus match position, calculated by the lens position calculation device is a true focus match position when a ratio between; (a) the change manifested by the integrating values of the first image-capturing signals between a first lens position corresponding to a largest value among the integrating values of the first image-capturing signals and a second lens position next to the first lens position and (b) the change manifested by the integrating values of the second image-capturing signals between the first lens position and the second lens position is equal to or greater than a preset determination threshold value.

It is also preferable that the determination device determines that the focus match position calculated by the lens position calculation device is a true focus match position when (A) the change manifested by the integrating values of the first image-capturing signals between a first lens position corresponding to a largest value among the integrating values of the first image-capturing signals and a second lens position next to the first lens position indicates a value equal to or greater than a predetermined value and (B) a ratio of the change manifested by the integrating values of the first image-capturing signals between the first lens position and the second lens position and the change manifested by the integrating values of the second image-capturing signals between the first lens position and the second lens position is equal to or greater than a preset determination threshold value.

It is preferable that the determination device judges that the focus match position calculated by the lens position calculation device is a false focus match position when (1) the change manifested by the integrating values of the first image-capturing signals between a first lens position corresponding to a largest value among the integrating values of the first image-capturing signals and a second lens position next to the first lens position indicates a value smaller than a first predetermined value and (2) the change manifested by the integrating values of the first image-capturing signals between the second lens position and a third lens position next to the second lens position indicates a value smaller than a second predetermined value which is greater than the first predetermined value.

It is preferable that the first lens position corresponds to a closeup end of a range over which the focus lens is allowed to move.

DESCRIPTION OF THE PREFERRED EMBODIMENT

The following is an explanation of an embodiment of the present invention, given reference to the drawings.

Figure 1:
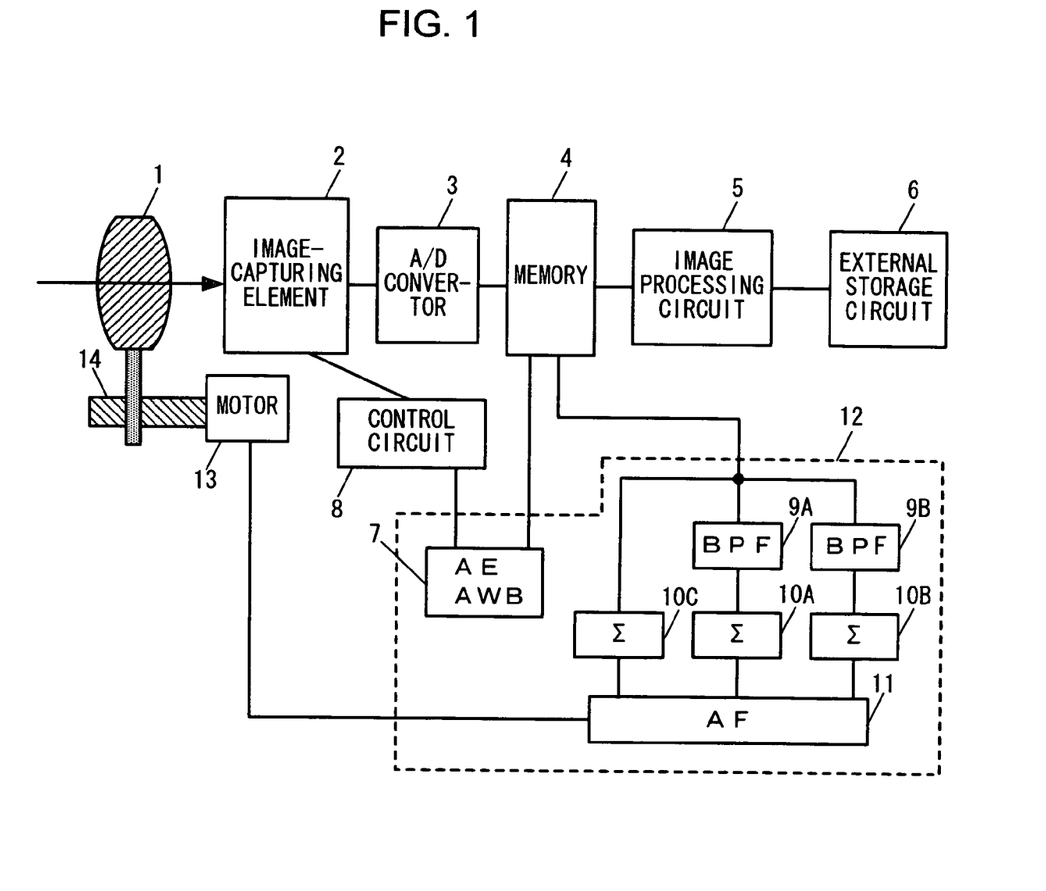
FIG. 1 is a block diagram showing the essential structural features of an autofocus (AF) electronic camera achieved in an embodiment of the present invention.

FIG. 1 is a block diagram showing the essential structural features of an autofocus (AF) electronic camera achieved in an embodiment of the present invention. The electronic camera in FIG. 1 includes a lens unit 1, an image-capturing element 2, an A/D converter 3, a memory 4, an image processing circuit 5, a control circuit 8, a CPU 12, a motor 13 and a focus control mechanism 14.

The lens unit 1 includes a focus lens (not shown). The focus lens is used to adjust the focal point position so as to form a subject image having passed through the lens unit 1 onto an image-capturing surface of the image-capturing element 2. As the motor 13 drives the focus control mechanism 14, the focus control mechanism 14 causes the focus lens to move forward/backward along an optical axis. The motor 13 is driven with a lens drive signal output from the CPU 12.

The image-capturing element 2 may be constituted of, for instance, a two-dimensional CCD image sensor. The image-capturing element 2 captures the subject image on the image-capturing surface and outputs image-capturing signals each corresponding to a pixel. The signal levels of the image-capturing signals output from the image-capturing element 2 vary in correspondence to the intensity levels of the light entering the individual pixels. When the brightness of the subject is high and the intensity level of light entering a pixel exceeds the saturation level of light received by a photodiode constituting the pixel, the image-capturing signal output in correspondence to said pixel is output as a saturation level signal. If the intensity of the light entering a pixel is higher than the saturation level of light received by the photodiode, an image-capturing signal indicating the saturation level is output regardless of the specific level of the intensity of the incident light. It is to be noted that the image-capturing element 2 may be constituted by using MOS sensors or a CID instead of a CCD. The control circuit 8 generates a timing signal for the image-capturing element 2 and provides the timing signal to the image-capturing element 2.

The image-capturing signals output from the image-capturing element 2 are first converted to digital signals at the A/D converter 3 and are then stored into the memory 4. The image processing circuit 5 executes compression processing by adopting a specific method (e.g., JPEG) on the image data stored in the memory 4, and stores the image data having undergone the compression processing into an external storage circuit 6. The image processing circuit 5 executes decompression processing on compressed data read out from the external storage circuit 6, as well. The external storage circuit 6 maybe constituted of, for instance, a data storage member such as a memory card.

The CPU 12 includes an AE/AWB circuit 7, bandpass filters 9A and 9B, integrating operation circuits 10A, 10B and 10C and an AF circuit 11. The CPU 12, which is connected with the control circuit 8, the memory 4 and the like, executes various types of arithmetic operations for focal point detection (AF), photometering (AE), white balance adjustment (AWB) and the like in the electronic camera and also executes sequence control for camera operations. Various operation signals are input from an operating member (not shown) to the CPU 12. In response to the operation signals input from the operating member, the CPU 12 implements integrated management of a focal point detection control, an exposure control and a color balance control in the electronic camera.

The AE/AWB circuit 7 executes exposure calculation and white balance adjustment processing of the known art. The white balance adjustment processing is executed on image data stored in the memory 4.

The band pass filters 9A and 9B, are each used to extract a high frequency component of image data corresponding to a focal point detection area (focus area) in the image data stored in the memory 4 which have not undergone the image processing. The image data having undergone the filter processing at the band pass filters 9A and 9B do not contain as much low frequency component and, in particular, not as much DC component as the unfiltered image data. The band pass filter 9A has a first low range cutoff frequency, and the band pass filter 9B has a second low range cutoff frequency which is higher than the first low range cutoff frequency. In the explanation of the embodiment, the frequency band of the image data having the low frequency component removed through the band pass filter 9A is referred to as band 1 and the frequency band of the image data having the low frequency component removed through the band pass filter 9B is referred to as band 2. In addition, the frequency band of the unfiltered image data is referred to as band 3.

The integrating operation circuits 10A, 10B and 10C each calculate an integrating value of the image data corresponding to the pixels contained in the focus area. The integrating operation circuit 10A calculates the integrating value of the image data in band 1. The integrating operation circuit 10B calculates the integrating value of the image data in band 2. The integrating operation circuit 10C calculates the integrating value of the image data in band 3. The integrating operation circuits calculate the integrating values of the absolute values indicated by the individual sets of image data in order to determine the integrating value of a difference attributable to the high frequency component. The integrating value calculated at the integrating operation circuit 10C is equivalent to a value obtained by directly totalizing the values of the image-capturing signals from the image-capturing element 2, and contains information indicating a subject brightness level. Accordingly, the integrating value calculated at the integrating operation circuit 10C is used in an arithmetic operation or the like that require brightness information.

Figure 2:
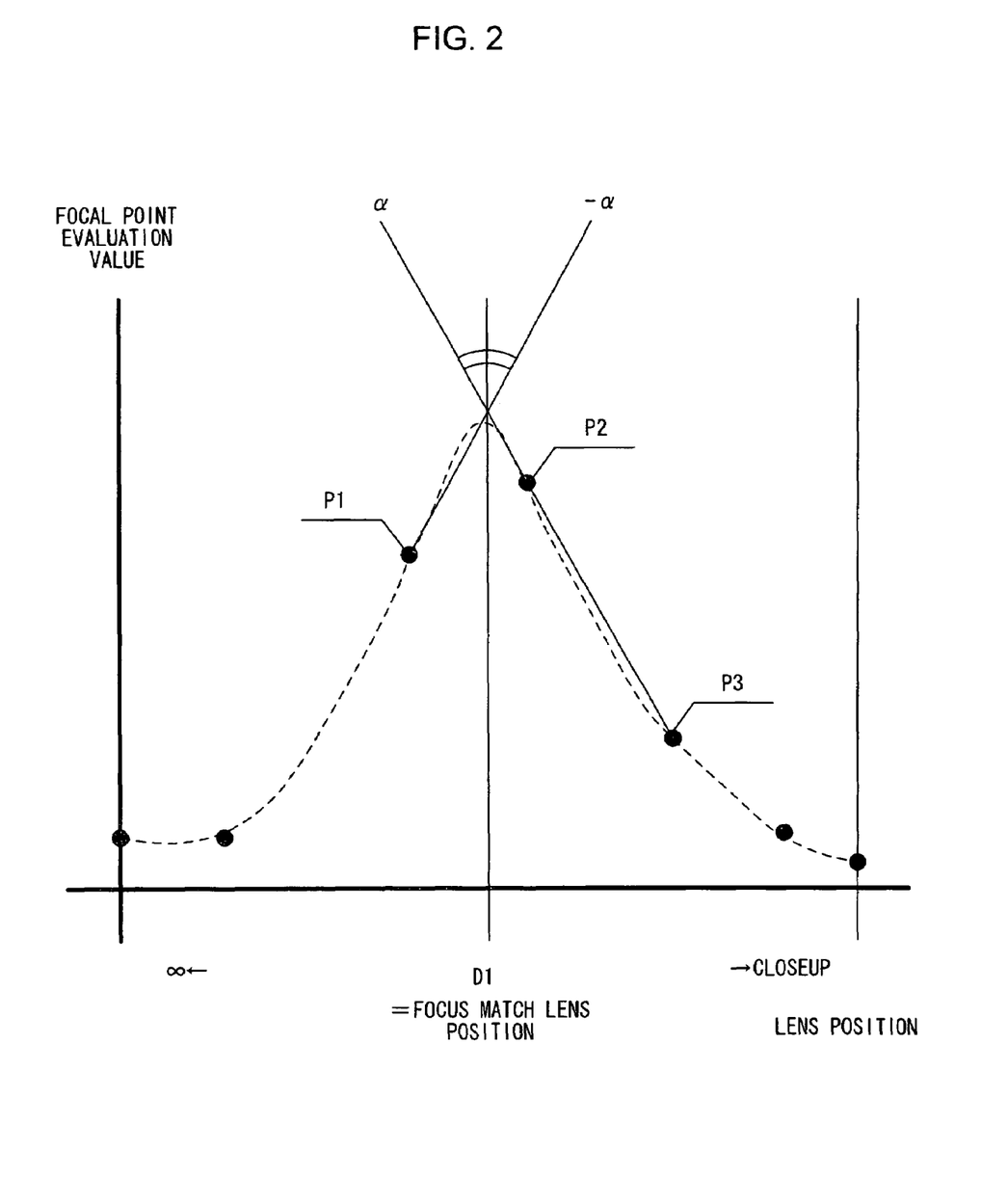
FIG. 2 presents an example of the relationship between the focus lens position and the focal point evaluation value.

The AF circuit 11 obtains focal point evaluation values by using the integrating values calculated at the integrating operation circuits 10A and 10B. FIG. 2 presents an example of the relationship between the position of the focus lens (not shown) in the photographic lens 1 and the focal point evaluation value. In FIG. 2, the focus lens position is indicated along the horizontal axis and the focal point evaluation value is indicated along the vertical axis. A lens position D1 at which the focal point evaluation value peaks is the focus match position at which the focus lens achieves focus match on the main subject.

The focal point evaluation value is calculated by, for instance, moving the focus lens from the ∞ (infinite distance) end toward the closeup end. The calculation rate at which the AF circuit 11 repeatedly calculates the focal point evaluation value is determined by the length of image-capturing period at the image-capturing element 2 and the length of time required to execute the filter processing and the integrating value calculation. For this reason, the focal point evaluation value is plotted as discrete data at the calculation rate, as indicated by the filled circles • in FIG. 2. The AF circuit 11 calculates the lens position D1 corresponding to the maximal point of the focal point evaluation value curve by executing a so-called 3-point interpolation calculation with three points P1 to P3 corresponding to the focal point evaluation value data, which include the point corresponding to the largest value indicated by the discrete data. The lens position D1 is equivalent to the intersecting point at which a straight line with an inclination α which passes through the largest value point P2 and the point P3 and a straight line with an inclination −α which passes through the point P1 intersect each other. At the lens position D1, any loss of sharpness around the edges of the subject image captured by the image-capturing element 2 is eliminated and the contrast of the image is optimized.

The present invention is characterized in that a decision is made during the focal point detection processing described above as to whether or not the point with the largest focal point evaluation value among the focal point evaluation values obtained between the ∞ end and the closeup end corresponds to the focus match position, i.e. whether or not the maximum focal point evaluation value corresponds to the maximal value in the focal point evaluation value curve.

Figure 3:
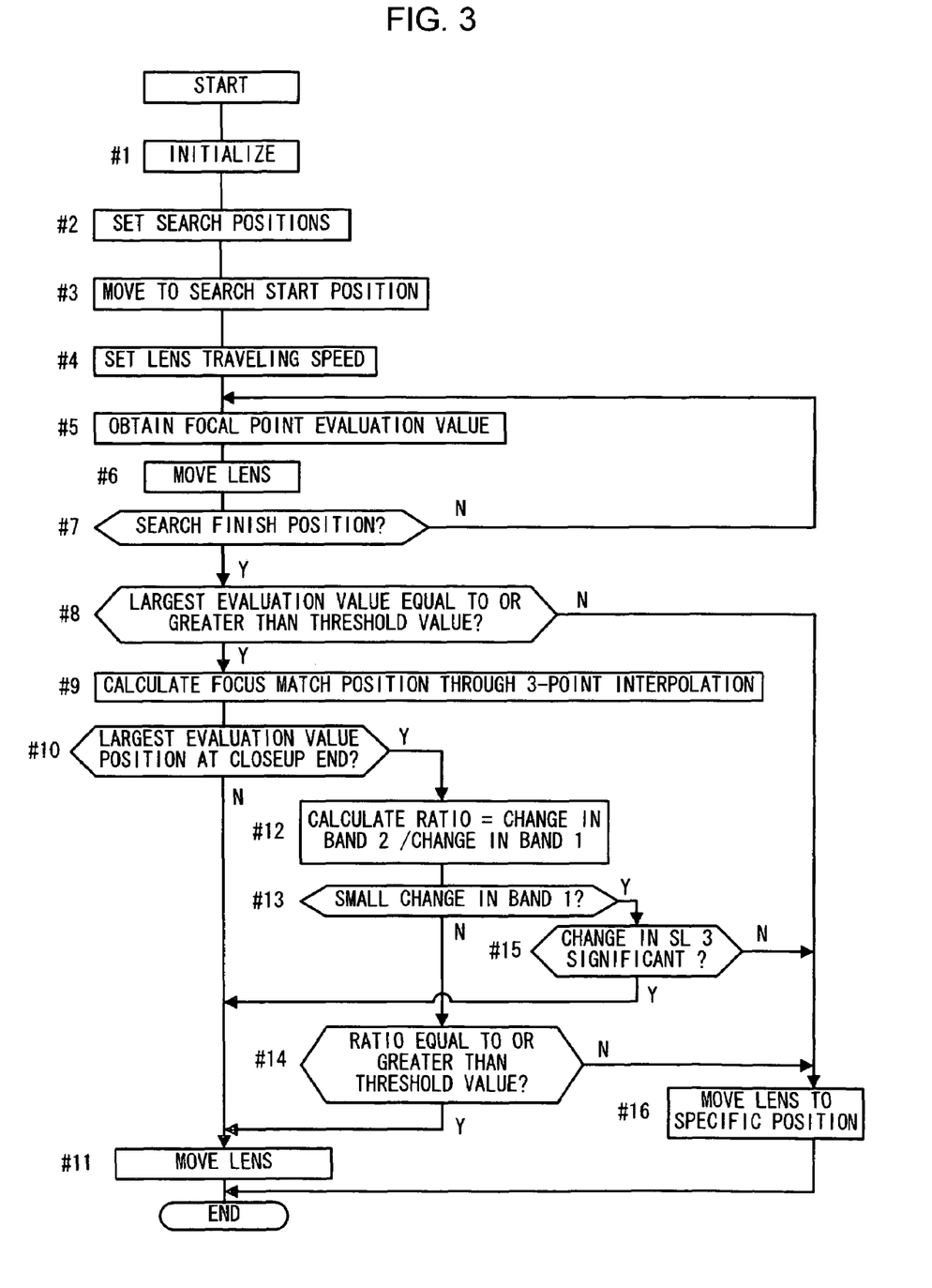
FIG. 3 presents a flowchart of the AF processing executed at a CPU.

An explanation is now given in reference to the flowchart presented in FIG. 3 on the AF processing executed at the CPU 12 of the AF electronic camera described above. The processing in FIG. 3 is started as, for instance, a halfway press operation signal is input from a shutter release switch (not shown) to the CPU 12. In step #1, the CPU 12 initializes flags and the like necessary for the processing and then the operation proceeds to step #2.

In step #2, the CPU 12 sets search positions, before the operation proceeds to step#3. In the embodiment, a search start position is set at the ∞ end and a search finish position is set at the closeup end. It is to be noted that the search start position may be set at the closeup end and the search finish position may be set at the ∞ end instead. In step #3, the CPU 12 outputs a drive signal to the motor 13 so as to move the focus lens (not shown) to the search start position, and then the operation proceeds to step #4.

In step #4, the CPU 12 sets the lens traveling speed before the operation proceeds to step #5. The length of time over which the focus lens travels from the search start position to the search finish position is determined in correspondence to the traveling speed. As the lens traveling speed is lowered, the number of sets of data used to plot the focal point evaluation value curve in FIG. 2 increases, whereas the number of sets of plotted data decreases as the lens traveling speed is raised. For this reason, it is desirable to set the lens traveling speed by ensuring that there will be at least three sets of data to be plotted to form a "peak" in the focal point evaluation value curve.

In step #5, the CPU 12 obtains the integrating values calculated at the integrating operation circuits 10A and 10B and stores them individually in the AF circuit 11 in correspondence to information indicating the specific focus lens position. Then the operation proceeds to step #6. The position of the focus lens is obtained by, for instance, reading the information indicating the lens position from the focus control mechanism 14.

In step #6, the CPU 12 outputs a drive signal to the motor 13 and then the operation proceeds to step #7. In response, the drive of the focus lens starts at the lens traveling speed set as described earlier. In step #7, the CPU 12 makes a decision as to whether or not the focus lens is at the search finish position. The CPU 12 makes an affirmative decision in step #7 if the focus lens is judged to be at the search finish position and in this case, the operation proceeds to step #8. If, on the other hand, the focus lens has not reached the search finish position, a negative decision is made in step #7 and the operation returns to step #5.

Through the processing executed in steps #5 to #7 as described above, a plurality of focal point evaluation values forming focal point evaluation value curves are obtained while the focus lens moves from the search start position to the search finish position. In this document, the plurality of focal point evaluation values forming the focal point evaluation value curve are referred to as a focal point evaluation value history record. At least two focal point evaluation value history records are obtained, one by using the image data in band 1 and the other by using the image data in band 2.

In step #8, the CPU 12 makes a decision as to whether or not the maximum value (the largest evaluation value) among the focal point evaluation values in band 1 is equal to or greater than a preset determination threshold value. The CPU 12 makes an affirmative decision in step #8 if the largest evaluation value is equal to or greater than the determination threshold value and subsequently, the operation proceeds to step #9, whereas a negative decision is made in step #8 if the largest evaluation value is smaller than the determination threshold value to proceed to step #16. When the operation proceeds to step #9, a sufficiently high level of contrast which is needed to execute the focal point detection processing is obtained from the subject image, whereas when the operation proceeds to step #16, the contrast needed to execute the focal point detection processing cannot be obtained from the subject image.

In step #9, the CPU 12 calculates the lens position D1 corresponding to the maximal point in the focal point evaluation value history record curve in band 1 through a 3-point interpolation calculation. In more specific terms, it searches for the largest value AFval1 (MaxLpos) among the focal point evaluation value history records in band 1 and then executes a 3-point interpolation calculation by using three points corresponding to the largest value AFval1 (MaxLpos) and the two values at the points immediately preceding and following the largest value point. In the example presented in FIG. 2, the point P2 corresponds to the largest value AFval1 (MaxLpos). It is to be noted that if the lens position (the largest evaluation value position) corresponding to the largest value AFval1 (MaxLpos) is exactly at the closeup end, the largest evaluation value position is set as the lens position D1. Once the lens position D1 is calculated, the operation proceeds to step #10.

In step #10, the CPU 12 makes a decision as to whether or not the largest evaluation value position is at the closeup end. The CPU 12 makes an affirmative decision in step #10 to proceed to step #12 if the largest evaluation value position is at the closeup end, whereas it makes a negative decision in step #10 to proceed to step #11 if the largest evaluation value position is not at the closeup end. The operation proceeds to step #11 only after making a maximal point confirmation. Namely, the CPU 12 regards the calculated lens position D1 to be the focus match position. If the maximal point confirmation has not been made, the operation proceeds to step #12 and the CPU 12 judges that there is a likelihood that the calculated lens position D1 is not the focus match position.

In step #11, the CPU 12 outputs a lens drive signal to the motor 13 to cause the focus lens (not shown) to move from the search finish position to the lens position D1 before ending the processing in FIG. 3.

In step #12, the CPU 12 calculates a ratio RR of the "change manifesting in the focal point evaluation value in band 2" and the "change manifesting in the focal point evaluation value in band 1" as explained below. The CPU calculates an adjacent difference SL1 between the largest evaluation value AFval1 (MaxLpos) and an evaluation value AFval1 (MaxLpos−1) at the point next to the largest value point (on the ∞ side) in band 1. The CPU calculates an adjacent difference SL 2 between the largest evaluation value AFval2 (MaxLpos) and an evaluation value AFval2 (MaxLpos−1) at the point next to the largest value point (on the ∞ side) in band 2. The CPU 12 further calculates an adjacent difference ratio RR=SL 2/SL 1. Once the CPU 12 calculates the ratio RR, the operation proceeds to step #13. It is to be noted that the adjacent difference ratio RR is calculated by using values each having a positive or negative sign attached thereto instead of absolute values.

In step #13, the CPU 12 makes a decision as to whether or not the value of the adjacent difference SL 1, i.e., the change (inclination) indicated by the focal point evaluation values in band 1, is smaller than a preset determination threshold value (e.g., 1000). The CPU 12 makes an affirmative decision in step #13 to proceed to step #15 if the absolute value |SL1| of the adjacent difference satisfies; |SL 1|≦1000, whereas it makes a negative decision in step #13 to proceed to step #14 if |SL 1| ≦1000 is not true. The operation proceeds to step #15 when there is a likelihood of the largest evaluation value AFval1 (MaxLpos) being within a predetermined range from the maximal value in the focal point evaluation value history record curve. The operation proceeds to step #14 when it is necessary to execute further decision-making processing.

In step #14, the CPU 12 makes a decision as to whether or not the adjacent difference ratio RR is equal to or greater than a preset determination threshold value (e.g., +0.45). The CPU 12 makes an affirmative decision in step #14 to proceed to step #11 if RR≧+0.45 is true, whereas it makes a negative decision in step #14 to proceed to step #16 if RR≧+0.45 is not true. The operation proceeds to step #11 when the calculated lens position D1 can be regarded as the focus match position ("true" decision). The operation proceeds to step #16 when the calculated lens position D1 cannot be regarded as the focus match position ("false" decision).

In step #15, the CPU 12 calculates an adjacent difference SL3 between the evaluation value AFval1 (MaxLpos−1) at the point next to the point with the largest evaluation value AFval1 (MaxLpos) on the ∞ side and the evaluation value (Max−2) Lpos1 at the next point further on the ∞ side in band 1. In addition, the CPU 12 makes a decision as to whether or not the value of the adjacent difference SL3, i.e., the change (inclination) indicated by the focal point evaluation values in band 1, is equal to or greater than a preset determination threshold value (e.g., 1500). The CPU 12 makes an affirmative decision in step #15 to proceed to step #11 if the absolute value |SL 3| of the adjacent difference satisfies; |SL 3|≧1500, whereas it makes a negative decision in step #15 to proceed to step #16 if |SL 3|≧1500 is not satisfied. The operation proceeds to step #11 when the calculated lens position D1 can be regarded as the focus match position ("true" decision). The operation proceeds to step #16 when the calculated lens position D1 cannot be regarded as match focus match position ("false" decision).

In step #16, the CPU 12 outputs a lens drive signal to the motor 13 to cause the focus lens (not shown) to move from the search finish position to a predetermined default position, before the processing in FIG. 3 ends. The focus lens is caused to move to the default position when the lens position cannot be calculated due to low contrast of the subject image or when the calculated lens position cannot be regarded as the correct focus match position (the lens position corresponding to the maximal point in the focal point evaluation history record curve).

The embodiment explained above is now summarized.

(1) The autofocus electronic camera that calculates focal point evaluation values by using the image-capturing signals corresponding to the focus area executes the focal point detection processing as described below. While the focus lens travels from the ∞ end to the closeup end, the integrating value of the image-capturing signals in the band 1 with the low frequency component equal to or less than the first cutoff frequency removed from the initial image-capturing signals and the integrating value of the image-capturing signals in band 2 having removed the low frequency component equal to or less than the second cutoff frequency which is higher than the first cutoff frequency are obtained in correspondence to each of a plurality of lens positions. Using these integrating values, the camera obtains focal point evaluation values in correspondence to the individual bands. In addition, if the largest evaluation value position in band 1 corresponds to the closeup end of the focus lens (if an affirmative decision is made in step #10), a decision is made in the camera as to whether or not the largest evaluation value position matches the correct focus match position (steps #12 through #15). As a result, it becomes possible to accurately detect whether or not a focus match state is achieved at the closeup end in particular.

Figure 4:
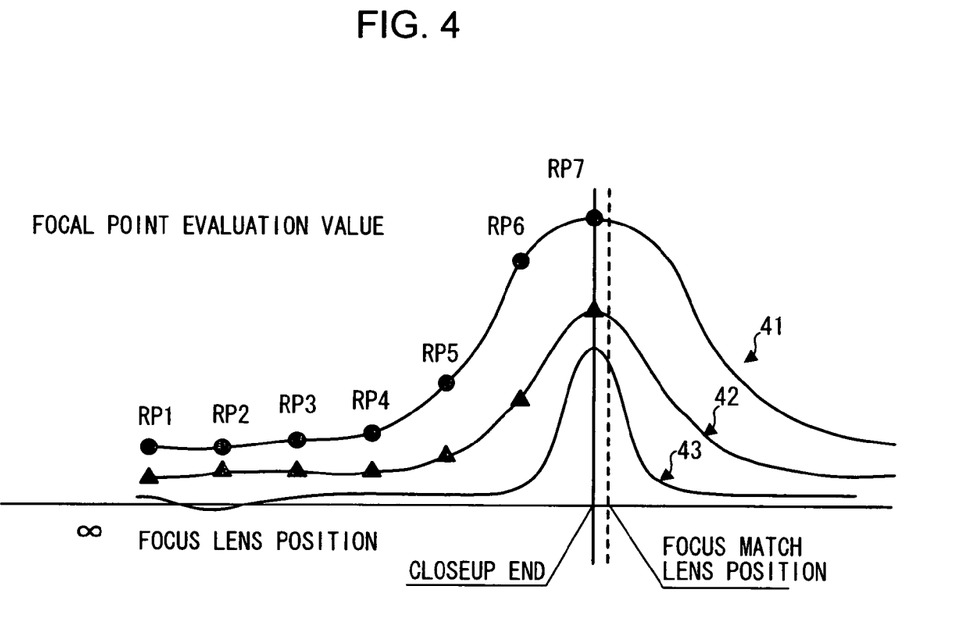
FIG. 4 presents an example of the relationship between the focus lens position and the focal point evaluation value that may manifest when the main subject is present at a position (over a distance) corresponding to the closeup end.
Figure 5:
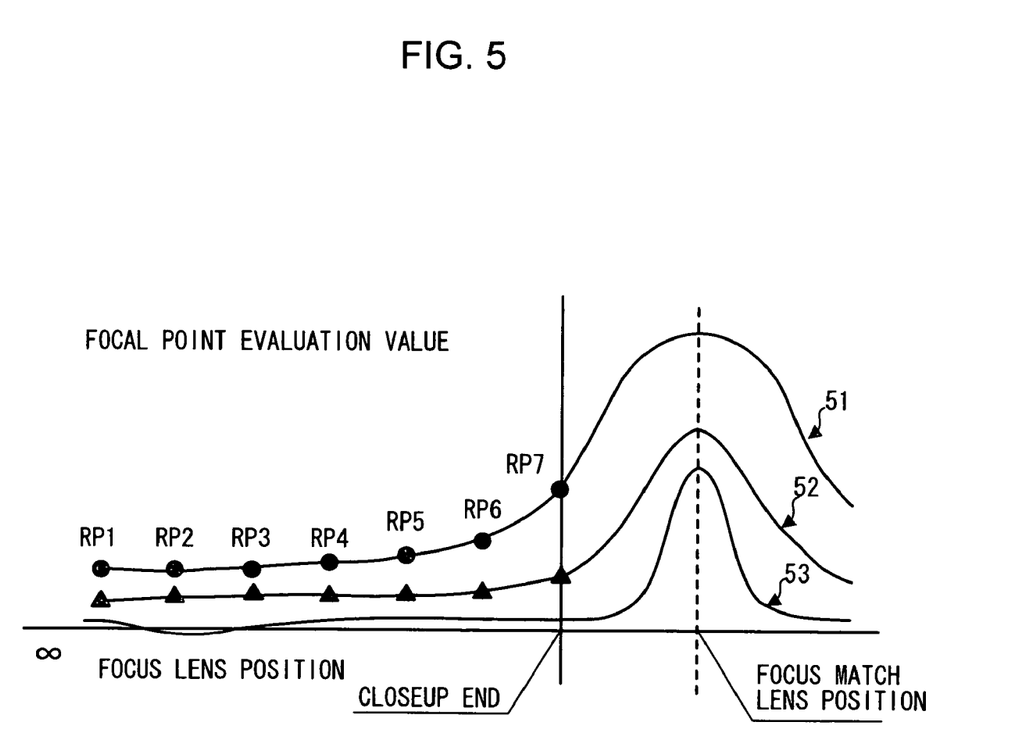
FIG. 5 presents an example of the relationship between the focus lens position and the focal point evaluation value that may manifest when the main subject is present further toward the camera relative to the position corresponding to the closeup end.

The feature summarized in (1) above is explained in further detail. FIG. 4 presents an example of the relationship between the focus lens position and the focal point evaluation value that may manifest when the main subject is present at the position (over the distance) corresponding to the closeup end of the focus lens. In FIG. 4, focal point evaluation value data are plotted at 7 points (RP1 to RP7) between the o end and the closeup end. A curve 41 is the focal point evaluation value history record curve in band 1, a curve 42 is the focal point evaluation value history record curve in band 2 and a curve 43 is a curve corresponding to the adjacent difference ratio RR. In the example presented in FIG. 4, the largest evaluation value position (the lens position corresponding to the point RP7) in band 1 can be regarded as the focus match position (focus match lens position). FIG. 5 presents an example of the relationship between the focus lens position and the focal point evaluation value that may manifest when the main subject is present further toward the camera relative to the position corresponding to the closeup end. A curve 51 is the focal point evaluation value history record curve in band 1, a curve 52 is the focal point evaluation value history record curve in band 2 and a curve 53 is a curve corresponding to the adjacent difference ratio RR. In the example presented in FIG. 5, the largest evaluation value position (the lens position corresponding to the point RP7) in band 1 is not the focus match position. While the largest value among the focal point evaluation value history records may not always match the focus match position as explained above, the camera according to the present invention is capable of judging that the closeup end is not the focus match position in a situation such as that illustrated in FIG. 5.

(2) The decision as to whether or not a focus match is achieved at the closeup end is executed through two systems of decision-making processing (in steps #13 and #14, and in steps #13 and #15). In the processing executed in steps #13 and #14, the calculated lens position is judged to be the focus match position (and the operation proceeds to step #11) if the adjacent difference SL 1 (the difference between the levels at the point RP 7 and the point RP 6 in FIG. 4) at the closeup end is large and the adjacent difference ratio RR(the value indicated by the curve 43 in FIG. 4) at the closeup end is equal to or greater than the determination threshold value. The value of the adjacent difference ratio RR, which is large at the focus match position, becomes smaller as the distance from the focus match position increases. In addition, when the focal point evaluation values in both band 1 and band 2 are small, noise causes the ± sign of the adjacent difference ratio RR to change. Generally speaking, a large adjacent difference SL 1 often implies that the focal point evaluation value history record curve is either ascending toward or descending from the peak and for this reason, it is difficult to determine the focus match position based upon the value of the adjacent difference SL 1 alone. According to the present invention, the value of the adjacent difference ratio RR having the characteristics described above is incorporated in the decision-making processing so as to accurately judge that the focus match position is at the closeup end ("true" focus match) in the state shown in FIG. 4.

(3) In the processing executed in steps #13 and #15, the calculated lens position is judged to be different from the focus match position (and the operation proceeds to step #16) when the adjacent difference SL 1 (the difference between the levels at the point RP 7 and the point RP 6 in FIG. 5) at the closeup end is small and the adjacent difference SL 3 (the difference between the levels at the point RP 6 and the point RP 5 in FIG. 5) at the points next to the closeup end is smaller than the determination threshold value. Generally speaking, the adjacent difference SL 1 becomes smaller and the adjacent difference SL 3 calculated for the two successive points next to the closeup end also becomes smaller as the distance from the maximal point in the focal point evaluation value history record curve increases. In contrast, the adjacent difference SL 1 takes on a small value but the next adjacent difference SL 3 takes on a larger value near the maximal point in the focal point evaluation value history record curve. According to the present invention, the two values representing the adjacent difference SL 1 and the adjacent difference SL 3 are used in the decision-making processing so as to accurately judge that the closeup end does not match the focus match position ("false" focus match) in the state shown in FIG. 5.

The determination threshold values used in the decision-making executed in steps #13, #14 and #15 as described above are not limited to those used in the explanation given above, and those threshold values may assume other values as appropriate.

While the CPU 12 executes the filter processing and the integrating operation processing by using the image data having been stored in the memory 4, it may instead execute the filter processing and the integrating operation processing by using data sequentially input thereto from the A/D converter 3.

In the explanation provided above, the processing in steps #12 through #15 is executed if the largest evaluation value position in band 1 corresponds to the closeup end of the focus lens (if an affirmative decision is made in step #10). Alternatively, the operation may skip step #10 and may always proceeds to step #12.

In step #9, the CPU 12 calculates the lens position D1 corresponding to the maximal point in the focal point evaluation value history record curve in band 1. Alternatively, a lens position corresponding to the maximal point in the focal point evaluation value history record curve in band 2 may be calculated.

As the focus lens moves to the focus match position in step #11, a focus match indicator may be turned on at an LED or the like.

As the focus lens moves in step #16, an indicator may be turned on at an LED or the like to indicate that a focus match has not been achieved.

The present invention may be adopted in a focal point detection device in a silver halide camera as well as in an electronic camera.

As described above, in the camera according to the present invention, integrating values of image-capturing signals having passed through different filters are calculated each in correspondence to a specific focus lens position and a decision is made with regard to the focus match state based upon changes manifesting between different lens positions in the two sets of integrating values. As a result, it is possible to accurately judge a "false" focus match that may occur when the main subject is present further toward the camera relative to the closeup end.

The above described embodiment is an example and various modifications can be made without departing from the spirit and scope of the invention.

What is claimed is:

1. A camera comprising:
   an image-capturing element that captures a subject image through a photographic lens;
   a first filter device that removes a frequency component equal to or lower than a first frequency from image-capturing signals obtained at pixels corresponding to a focus area of the image-capturing element;
   a second filter device that removes from the image-capturing signals a frequency component equal to or lower than a second frequency which is higher than the first frequency;
   a lens drive signal generation device that generates a lens drive signal used to move a focus lens;
   an evaluation value calculation device that calculates integrating values of first image-capturing signals from which the frequency component has been removed at the first filter device and integrating values of second image-capturing signals from which the frequency component has been removed at the second filter device, each in correspondence to a predefined position of the focus lens;
   a lens position calculation device that calculates a focus match lens position based upon one of a set of the integrating values of the first image-capturing signals and a set of the integrating values of the second image-capturing signals calculated by the evaluation value calculation device; and
   a determination device that makes a true/false decision with regard to a focus match position, calculated by the lens position calculation device, based upon a change manifested by the integrating values of the first image-capturing signals and a change manifested by the integrating values of the second image-capturing signals between predefined positions taken by the focus lens, wherein:
   the determination device determines that the focus match position, calculated by the lens position calculation device is a true focus match position when a ratio between; (a) the change manifested by the integrating values of the first image-capturing signals between a first lens position corresponding to a largest value among the integrating values of the first image-capturing signals and a second lens position next to the first lens position and (b) the change manifested by the integrating values of the second image-capturing signals between the first lens position and the second lens position is equal to or greater than a preset determination threshold value.

2. A camera comprising:

an image-capturing element that captures a subject image through a photographic lens;

a first filter device that removes a frequency component equal to or lower than a first frequency from image-capturing signals obtained at pixels corresponding to a focus area of the image-capturing element;

a second filter device that removes from the image-capturing signals a frequency component equal to or lower than a second frequency which is higher than the first frequency;

a lens drive signal generation device that generates a lens drive signal used to move a focus lens;

an evaluation value calculation device that calculates integrating values of first image-capturing signals from which the frequency component has been removed at the first filter device and integrating values of second image-capturing signals from which the frequency component has been removed at the second filter device, each in correspondence to a predefined position of the focus lens;

a lens position calculation device that calculates a focus match lens position based upon one of a set of the integrating values of the first image-capturing signals and a set of the integrating values of the second image-capturing signals calculated by the evaluation value calculation device; and a determination device that makes a true/false decision with regard to a focus match position, calculated by the lens position calculation device, based upon a change manifested by the integrating values of the first image-capturing signals and a change manifested by the integrating values of the second image-capturing signals between predefined positions taken by the focus lens, wherein:

the determination device determines that the focus match position calculated by the lens position calculation device is a true focus match position when (A) the change manifested by the integrating values of the first image-capturing signals between a first lens position corresponding to a largest value among the integrating values of the first image-capturing signals and a second lens position next to the first lens position indicates a value equal to or greater than a predetermined value and (B) a ratio of the change manifested by the integrating values of the first image-capturing signals between the first lens position and the second lens position and the change manifested by the integrating values of the second image-capturing signals between the first lens position and the second lens position is equal to or greater than a preset determination threshold value.

3. A camera comprising:

an image-capturing element that captures a subject image through a photographic lens;

a first filter device that removes a frequency component equal to or lower than a first frequency from image-capturing signals obtained at pixels corresponding to a focus area of the image-capturing element;

a second filter device that removes from the image-capturing signals a frequency component equal to or lower than a second frequency which is higher than the first frequency;

a lens drive signal generation device that generates a lens drive signal used to move a focus lens;

an evaluation value calculation device that calculates integrating values of first image-capturing signals from which the frequency component has been removed at the first filter device and integrating values of second image-capturing signals from which the frequency component has been removed at the second filter device, each in correspondence to a predefined position of the focus lens;

a lens position calculation device that calculates a focus match lens position based upon one of a set of the integrating values of the first image-capturing signals and a set of the integrating values of the second image-capturing signals calculated by the evaluation value calculation device; and a determination device that makes a true/false decision with regard to a focus match position, calculated by the lens position calculation device, based upon a change manifested by the integrating values of the first image-capturing signals and a change manifested by the integrating values of the second image-capturing signals between predefined positions taken by the focus lens, wherein:

the determination device judges that the focus match position calculated by the lens position calculation device is a false focus match position when (1) the change manifested by the integrating values of the first image-capturing signals between a first lens position corresponding to a largest value among the integrating values of the first image-capturing signals and a second lens position next to the first lens position indicates a value smaller than a first predetermined value and (2) the change manifested by the integrating values of the first image-capturing signals between the second lens position and a third lens position next to the second lens position indicates a value smaller than a second predetermined value which is greater than the first predetermined value.

4. A camera according to claim 1, wherein:

the first lens position corresponds to a closeup end of a range over which the focus lens is allowed to move.

5. A camera according to claim 2, wherein:

the first lens position corresponds to a closeup end of a range over which the focus lens is allowed to move.

6. A camera according to claim 3, wherein:

the first lens position corresponds to a closeup end of a range over which the focus lens is allowed to move.

7. A camera comprising:

an image pickup device that captures a subject image through a photographic lens;

a first filter device that removes a frequency component equal to or lower than a first frequency from image-capturing signals obtained at pixels corresponding to a focus area of the image pickup device;

a second filter device that removes from the image-capturing signals a frequency component equal to or lower than a second frequency which is higher than the first frequency;

a drive circuit that generates a lens drive signal used to move a focus lens;

a first calculator that calculates integrating values of first image-capturing signals from which the frequency component has been removed at the first filter device and integrating values of second image-capturing signals from which the frequency component has been removed at the second filter device, each in correspondence to a predefined position of the focus lens;

a second calculator that calculates a focus match lens position based upon one of a set of the integrating values of the first image-capturing signals and a set of the integrating values of the second image-capturing signals calculated by the first calculator; and a controller that makes a true/false decision with regard to a focus match position, calculated by the second calculator, based upon a change manifested by the integrating values of the first image-capturing signals and a change manifested by the integrating values of the second image-capturing signals between predefined positions taken by the focus lens, wherein:

the controller determines that the focus match position, calculated by the second calculator is a true focus match position when a ratio between; (a) the change manifested by the integrating values of the first image-capturing signals between a first lens position corresponding to a largest value among the integrating values of the first image-capturing signals and a second lens position next to the first lens position and (b) the change manifested by the integrating values of the second image-capturing signals between the first lens position and the second lens position is equal to or greater than a preset determination threshold value.

8. A camera according to claim 7, wherein:
the first lens position corresponds to a closeup end of a range over which the focus lens is allowed to move.

9. A camera comprising:
an image pickup device that captures a subject image through a photographic lens;
a first filter device that removes a frequency component equal to or lower than a first frequency from image-capturing signals obtained at pixels corresponding to a focus area of the image pickup device;
a second filter device that removes from the image-capturing signals a frequency component equal to or lower than a second frequency which is higher than the first frequency;
a drive circuit that generates a lens drive signal used to move a focus lens;
a first calculator that calculates integrating values of first image-capturing signals from which the frequency component has been removed at the first filter device and integrating values of second image-capturing signals from which the frequency component has been removed at the second filter device, each in correspondence to a predefined position of the focus lens;
a second calculator that calculates a focus match lens position based upon one of a set of the integrating values of the first image-capturing signals and a set of the integrating values of the second image-capturing signals calculated by the first calculator; and
a controller that makes a true/false decision with regard to a focus match position, calculated by the second calculator, based upon a change manifested by the integrating values of the first image-capturing signals and a change manifested by the integrating values of the second image-capturing signals between predefined positions taken by the focus lens, wherein:
the controller determines that the focus match position calculated by the lens position calculation device is a true focus match position when (A) the change manifested by the integrating values of the first image-capturing signals between a first lens position corresponding to a largest value among the integrating values of the first image-capturing signals and a second lens position next to the first lens position indicates a value equal to or greater than a predetermined value and (B) a ratio of the change manifested by the integrating values of the first image-capturing signals between the first lens position and the second lens position and the change manifested by the integrating values of the second image-capturing signals between the first lens position and the second lens position is equal to or greater than a preset determination threshold value.

10. A camera according to claim 9, wherein:
the first lens position corresponds to a closeup end of a range over which the focus lens is allowed to move.

11. A camera comprising:
an image pickup device that captures a subject image through a photographic lens;
a first filter device that removes a frequency component equal to or lower than a first frequency from image-capturing signals obtained at pixels corresponding to a focus area of the image pickup device;
a second filter device that removes from the image-capturing signals a frequency component equal to or lower than a second frequency which is higher than the first frequency;
a drive circuit that generates a lens drive signal used to move a focus lens;
a first calculator that calculates integrating values of first image-capturing signals from which the frequency component has been removed at the first filter device and integrating values of second image-capturing signals from which the frequency component has been removed at the second filter device, each in correspondence to a predefined position of the focus lens;
a second calculator that calculates a focus match lens position based upon one of a set of the integrating values of the first image-capturing signals and a set of the integrating values of the second image-capturing signals calculated by the first calculator; and
a controller that makes a true/false decision with regard to a focus match position, calculated by the second calculator, based upon a change manifested by the integrating values of the first image-capturing signals and a change manifested by the integrating values of the second image-capturing signals between predefined positions taken by the focus lens, wherein:
the controller judges that the focus match position calculated by the second calculator is a false focus match position when (1) the change manifested by the integrating values of the first image-capturing signals between a first lens position corresponding to a largest value among the integrating values of the first image-capturing signals and a second lens position next to the first lens position indicates a value smaller than a first predetermined value and (2) the change manifested by the integrating values of the first image-capturing signals between the second lens position and a third lens position next to the second lens position indicates a value smaller than a second predetermined value which is greater than the first predetermined value.

12. A camera according to claim 11, wherein:
the first lens position corresponds to a closeup end of a range over which the focus lens is allowed to move.

13. A method for capturing an image comprising:
capturing a subject image through a photographic lens;
removing a frequency component equal to or lower than a first frequency from image-capturing signals obtained at pixels corresponding to a focus area;
removing from the image-capturing signals a frequency component equal to or lower than a second frequency which is higher than the first frequency;
generating a lens drive signal form moving a focus lens;
calculating integrating values of first image-capturing signals from which the frequency component has been removed and integrating values of second image-capturing signals from which the frequency component has been removed, each in correspondence to a predefined position of the focus lens;

calculating a focus match lens position based upon one of a set of the integrating values of the first image-capturing signals and a set of the integrating values of the second image-capturing signals; and determining a true/false decision with regard to a focus match position based upon a change manifested by the integrating values of the first image-capturing signals and a change manifested by the integrating values of the second image-capturing signals between predefined positions taken by the focus lens, wherein:

determining that the focus match position is a true focus match position when a ratio between; (a) the change manifested by the integrating values of the first image-capturing signals between a first lens position corresponding to a largest value among the integrating values of the first image-capturing signals and a second lens position next to the first lens position and (b) the change manifested by the integrating values of the second image-capturing signals between the first lens position and the second lens position is equal to or greater than a preset determination threshold value.

14. A method according to claim 13, wherein:
the first lens position corresponds to a closeup end of a range over which the focus lens is allowed to move.

15. A method for capturing an image comprising:
capturing a subject image through a photographic lens;
removing a frequency component equal to or lower than a first frequency from image-capturing signals obtained at pixels corresponding to a focus area;
removing from the image-capturing signals a frequency component equal to or lower than a second frequency which is higher than the first frequency;
generating a lens drive signal used to move a focus lens;
calculating integrating values of first image-capturing signals from which the frequency component has been removed and integrating values of second image-capturing signals from which the frequency component has been removed, each in correspondence to a predefined position of the focus lens;
calculating a focus match lens position based upon one of a set of the integrating values of the first image-capturing signals and a set of the integrating values of the second image-capturing signals; and
determining a true/false decision with regard to a focus match position based upon a change manifested by the integrating values of the first image-capturing signals and a change manifested by the integrating values of the second image-capturing signals between predefined positions taken by the focus lens, wherein:
determining that the focus match position is a true focus match position when (A) the change manifested by the integrating values of the first image-capturing signals between a first lens position corresponding to a largest value among the integrating values of the first image-capturing signals and a second lens position next to the first lens position indicates a value equal to or greater than a predetermined value and (B) a ratio of the change manifested by the integrating values of the first image-capturing signals between the first lens position and the second lens position and the change manifested by the integrating values of the second image-capturing signals between the first lens position and the second lens position is equal to or greater than a preset determination threshold value.

16. A method according to claim 15, wherein:
the first lens position corresponds to a closeup end of a range over which the focus lens is allowed to move.

17. A method for capturing an image comprising:
capturing a subject image through a photographic lens;
removing a frequency component equal to or lower than a first frequency from image-capturing signals obtained at pixels corresponding to a focus area;
removing from the image-capturing signals a frequency component equal to or lower than a second frequency which is higher than the first frequency;
generating a lens drive signal used to move a focus lens;
calculating integrating values of first image-capturing signals from which the frequency component has been removed and integrating values of second image-capturing signals from which the frequency component has been removed, each in correspondence to a predefined position of the focus lens;
calculating a focus match lens position based upon one of a set of the integrating values of the first image-capturing signals and a set of the integrating values of the second image-capturing signals; and
determining a true/false decision with regard to a focus match position based upon a change manifested by the integrating values of the first image-capturing signals and a change manifested by the integrating values of the second image-capturing signals between predefined positions taken by the focus lens, wherein:
determining that the focus match position is a false focus match position when (1) the change manifested by the integrating values of the first image-capturing signals between a first lens position corresponding to a largest value among the integrating values of the first image-capturing signals and a second lens position next to the first lens position indicates a value smaller than a first predetermined value and (2) the change manifested by the integrating values of the first image-capturing signals between the second lens position and a third lens position next to the second lens position indicates a value smaller than a second predetermined value which is greater than the first predetermined value.

18. A method according to claim 17, wherein:
the first lens position corresponds to a closeup end of a range over which the focus lens is allowed to move.

* * * * *